(12) United States Patent
Arndt et al.

(10) Patent No.: US 8,429,966 B2
(45) Date of Patent: Apr. 30, 2013

(54) CAPACITIVE FILL LEVEL SENSOR AND METHOD FOR ESTIMATING A FILL LEVEL

(75) Inventors: Michael Arndt, Allendorf (DE); Markus Niemann, Beckingen (DE)

(73) Assignee: Robert Bosch GmbH, Stuttgart (DE)

( * ) Notice: Subject to any disclaimer, the term of this patent is extended or adjusted under 35 U.S.C. 154(b) by 275 days.

(21) Appl. No.: 12/812,083

(22) PCT Filed: Nov. 18, 2008

(86) PCT No.: PCT/EP2008/065718
§ 371 (c)(1),
(2), (4) Date: Sep. 29, 2010

(87) PCT Pub. No.: WO2009/086980
PCT Pub. Date: Jul. 16, 2009

(65) Prior Publication Data
US 2011/0185808 A1      Aug. 4, 2011

(30) Foreign Application Priority Data
Jan. 10, 2008   (DE) .......................... 10 2008 003 802

(51) Int. Cl.
*G01F 23/26* (2006.01)
(52) U.S. Cl.
USPC ....................................... 73/304 C

(58) Field of Classification Search ................. 73/304 C; 324/658, 663, 671, 674, 681, 686
See application file for complete search history.

(56) References Cited

U.S. PATENT DOCUMENTS

| | | | |
|---|---|---|---|
| 4,122,718 A | 10/1978 | Gustafson | |
| 6,924,214 B2 * | 8/2005 | Jakoby | ........................ 438/496 |
| 2003/0184318 A1 | 10/2003 | Lenormand et al. | |

FOREIGN PATENT DOCUMENTS

| | | |
|---|---|---|
| DE | 11 99 010 | 8/1965 |
| DE | 38 24 231 | 1/1990 |
| DE | 195 11 556 | 7/1996 |
| DE | 197 28 280 | 5/1998 |
| DE | 199 38 270 | 2/2001 |
| DE | 101 44 875 | 3/2003 |

* cited by examiner

*Primary Examiner* — Peter Macchiarolo
*Assistant Examiner* — Jamar Ray
(74) *Attorney, Agent, or Firm* — Kenyon & Kenyon LLP

(57) ABSTRACT

A capacitive fill level sensor for determining a fill level of a liquid is described. Two electrodes are provided having a plastic sheathing and a capacitance measuring device for detecting the electrical capacitance between the electrodes. An estimator device is used for estimating a fill level of a liquid between the electrodes based on the detected electrical capacitance, taking into account different dielectric constants for sections of the plastic sheathing in the liquid and outside of the liquid.

6 Claims, 1 Drawing Sheet

CAPACITIVE FILL LEVEL SENSOR AND METHOD FOR ESTIMATING A FILL LEVEL

FIELD OF THE INVENTION

The present invention relates to a capacitive fill level sensor and a method for estimating a fill level, in particular for continuously estimating a fill level in a liquid container with the aid of a capacitive fill level sensor.

BACKGROUND INFORMATION

Capacitive fill level sensors are discussed in DE 195 11 556 C1 and DE 197 28 280 A1. The sensors have two cylindrical metal electrodes situated one inside the other. The liquid may flow into an interspace between the two cylinders and fill up the interspace, depending on the fill level. The liquid, which has a higher dielectric constant, displaces air, which has a comparatively low dielectric constant. The electrical capacitance between the two electrodes is obtained according to the proportion of liquid between the two electrodes. An evaluation circuit determines the capacitance and estimates the fill level on that basis.

When using fill level sensors, it is important to be sure that their electrodes are resistant to the liquids. In the case of highly reactive liquids, e.g., uric acid, extremely high-grade electrodes of noble metals or corrosion-resistant steels must therefore be used.

SUMMARY OF THE INVENTION

The fill level sensor according to the exemplary embodiments and/or exemplary methods of the present invention therefore provides the following features: two electrodes having a plastic sheathing, a capacitance measuring device for detecting the electrical capacitance between the electrodes, and an estimating device for estimating a fill level (h) of a liquid between the electrodes based on the electrical capacitance detected, taking into account a different dielectric constant for sections of the plastic sheathing in the liquid and outside of the liquid.

The fill level sensor according to the exemplary embodiments and/or exemplary methods of the present invention uses a plastic coating of the metallic electrodes. An improved corrosion resistance is achieved in this way. The method according to the present invention also takes into account the impregnation of the plastic with the liquid to achieve a measuring accuracy comparable to that of exposed metallic electrodes.

According to another aspect of the exemplary embodiments and/or exemplary methods of the present invention, a method for estimating the fill level comprises the following steps: detecting an electrical capacitance between two electrodes having a plastic sheathing and estimating a fill level of a liquid between the electrodes based on the detected electrical capacitance, taking into account a different dielectric constant for sections of the plastic sheathing inside the liquid and outside the liquid.

The exemplary embodiments and/or exemplary methods of the present invention is explained below on the basis of specific embodiments and the accompanying figures.

DETAILED DESCRIPTION

Figure 1:
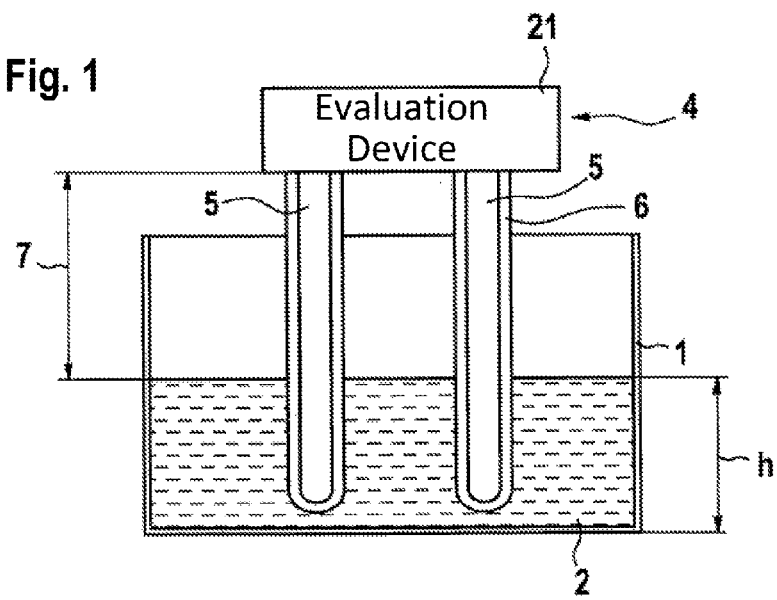
FIG. 1 shows a schematic diagram of a fill level sensor in cross section.
Figure 2:
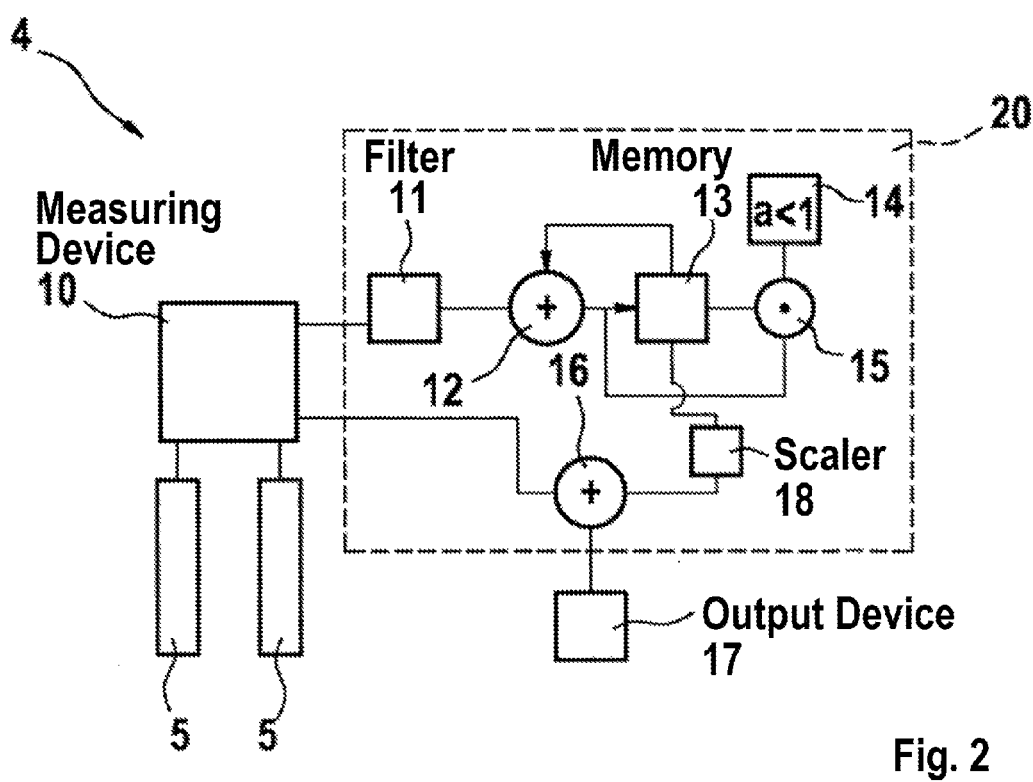
FIG. 2 shows a block diagram of the fill level sensor of FIG. 1.

A liquid 2 is present up to a fill level h in a liquid container 1. A fill level sensor 4 according to one specific embodiment is immersed in liquid 2 at its two electrodes 5. Both electrodes 5 are coated with a plastic sheathing 6. The material of plastic sheathing 6 is selected for being resistant to liquids 2, which typically flow around fill level sensor 4.

The two electrodes 5 form a capacitor having a capacitance C. Capacitance C depends on the geometry of electrodes 5 and the dielectrics between the electrodes. In a lower area of electrodes 5, liquid 2 dominates the dielectric properties, with plastic 6 also making a minor contribution. In the upper section of electrodes 5, plastic 6 having a specific dielectric constant of 4 to 4.5, which is typical and is much different from that of air, makes a non-negligible contribution, despite a comparatively small wall thickness.

The plastic of the plastic sheathing is impregnated with liquid 2. This typically changes the dielectric constant until the plastic is saturated with the liquid. This process is largely reversible. If the plastic is in contact with air, the plastic dries out. The dielectric constant of the plastic then returns to its original value.

In a first model, the capacitance may be approximated as a parallel circuit of the lower section, which is immersed in liquid, and the upper section, which is in air.

The upper section, which is not in the liquid, is approximated as a series connection of two upper capacitors. The first upper capacitor corresponds to the section of plastic sheathing 6 in air, assuming a dried plastic having a corresponding dielectric constant. The second upper capacitor corresponds to the air-filled interspace between plastic sheathings 6.

The lower section in the liquid is approximated as a series connection of two lower capacitors. The first lower capacitor corresponds to the section of plastic sheathing 6, which is in the liquid, assuming a plastic impregnated with liquid and having a corresponding dielectric constant. The second lower capacitor corresponds to the interspace between plastic sheathings 6 filled with liquid.

Fill level h defines the proportions in which the upper and lower sections contribute toward the total capacitance.

A method for estimating the fill level determines the electrical capacitance first. A capacitance measuring device 10 is therefore connected to both electrodes 5. An evaluation unit 21 then determines fill level h on the basis of the electrical capacitance and the above model having the parallel circuit. To do so, it ascertains which proportions the upper and lower sections must have to coincide with the measured electrical capacitance.

Another specific embodiment takes into account changes which may occur when liquid 2 is withdrawn from container 1. When it is withdrawn, fill level h drops and consequently also the measured capacitance drops. Measuring device 10 detects the change in capacitance.

Due to the drop in fill level h, a section of plastic sheathing 6 previously wetted by liquid is exposed to air.

With a typical time constant of several minutes to a few hours, plastic sheathing 6 dries out. The dielectric constant of the plastic may change, usually by dropping, e.g., from 4.4 to 4.0. Consequently, the capacitance also changes with this time constant. Shortly after withdrawal of liquid 2, the measured value output by measuring device 10 is too high, for example, because the plastic has not yet dried out. With increasing time, the measured value then approximates the expected measured value when the estimation algorithms are based on a dry plastic in the upper section, as in the method described above for determining fill level h.

Fill level sensor 4 may assume a dielectric constant for the plastic, which is between the dielectric constant of the dried plastic and that of the impregnated plastic, to compensate for the altered values due to the plastic drying out.

Another specific embodiment of fill level sensor 4 takes into account the change in the dielectric constant over time. A compensation device 20 or corresponding method steps are provided for this purpose.

The measured values output by measuring device 10 are sent to a high-pass filter 11. The high-pass filter is designed in such a way that a signal corresponding to a change in the electrical capacitance is suppressed due to drying of the plastic. The time constant of the high-pass filter may therefore be lower by one order of magnitude than the typical time constant for drying. However, the time constant of the high-pass filter is low enough so that signals are forwarded due to the direct filling and emptying of container 1. These rapid changes in capacitance are output by high-pass filter 11.

The output of high-pass filter 11 is connected to a summation unit 12 and an accumulator memory 13. Summation unit 13 adds up the rapid changes in capacitance up to that point and stores the value in accumulator memory 13.

A damping element 14, 15, which reduces the value in accumulator memory 13 at a predefined damping rate, acts on accumulator memory 13. For example, this may be accomplished via regular multiplication by a value a of less than one. The damping rate may correspond to the typical drying rate of the plastic. The correction value reserved by accumulator memory 13 is thus reduced in synchronization with the drying of the plastic.

The correction value in accumulator memory 13 may be sent to a scaling device 18, which multiplies the correction value by a constant negative value b.

The output value of scaling device 18 and the value of measuring device 10 are added up by an adder 16. An output device 17 outputs an estimated fill level value based on this sum, a dry plastic being assumed for the section in air. The functioning and design of the output device may correspond to those of evaluation device 21.

Accumulator memory 13 generates a correction summand, which is reduced according to the time constant of drying out. At the point in time when no more changes due to drying are to be expected, the correction summand has also dropped to zero.

Filter 11, summation unit 12, accumulator memory 13, damping element 14, 15 and multiplier 18 may be implemented by analog or digital components.

What is claimed is:

1. A capacitive fill level sensor, comprising:
    two electrodes having a plastic sheathing;
    a capacitance measuring device for detecting an electrical capacitance between the electrodes;
    an estimator device for estimating a fill level of a liquid between the electrodes based on the detected electrical capacitance and different dielectric constants for sections of the plastic sheathing in the liquid and outside of the liquid; and
    a compensation device for compensating for a drift of the detected electrical capacitance due to a change in the dielectric constant of a section of the plastic sheathing when this section dries out after a drop in the fill level, wherein the plastic sheathing in the liquid is impregnated with the liquid and the compensation device includes:
        a high-pass filter for determining high-frequency changes in the electrical capacitance;
        an accumulator for accumulating the high-frequency changes in the electrical capacitance to form an accumulation value;
        a damping element for periodic damping of the accumulation value at a damping rate; and
        an adder which is connected to the capacitance measuring device and to the accumulator for compensating for the detected electrical capacitance using the accumulation value.

2. The capacitive fill level sensor of claim 1, wherein the high-pass filter has a time constant, whose inverse is between a rate of change in the fill level and a rate of change in the dielectric constant when the plastic sheathing is dried.

3. The capacitive fill level sensor of claim 1, wherein the damping rate is selected to be equivalent to a rate of change in the dielectric constant when the plastic sheathing is dried.

4. A method for estimating a fill level, the method comprising:
    detecting an electrical capacitance between two electrodes having a plastic sheathing;
    estimating a fill level of a liquid between the electrodes, based on the electrical capacitance detected and different dielectric constants for sections of the plastic sheathing in the liquid and outside of the liquid, the plastic in the liquid being impregnated with liquid;
    determining high-frequency changes in the electrical capacitance with the aid of a high-pass filter;
    accumulating the high-frequency changes in the electrical capacitance to form an accumulation value;
    periodically damping the accumulation value at a damping rate; and
    compensating a drift of the detected electrical capacitance using the accumulation value, wherein the drift is due to a change in the dielectric constant of a section of the plastic sheathing when this section dries after a drop in the filling level.

5. The method of claim 4, wherein high-frequency changes in the electrical capacitance are determined, which have a frequency between a rate of change in the fill level and a rate of change in the dielectric constant when the plastic sheathing is dried.

6. The method of claim 4, wherein the damping rate is selected to be equivalent to a rate of change in the dielectric constant when the plastic sheathing is dried.

* * * * *

UNITED STATES PATENT AND TRADEMARK OFFICE
CERTIFICATE OF CORRECTION

PATENT NO. : 8,429,966 B2  
APPLICATION NO. : 12/812083  
DATED : April 30, 2013  
INVENTOR(S) : Arndt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this
Eighth Day of September, 2015

Michelle K. Lee
*Director of the United States Patent and Trademark Office*